Aug. 27, 1957   F. W. W. MORLEY   2,804,323
AXIAL-FLOW COMPRESSORS AND TURBINES
Filed July 22, 1955
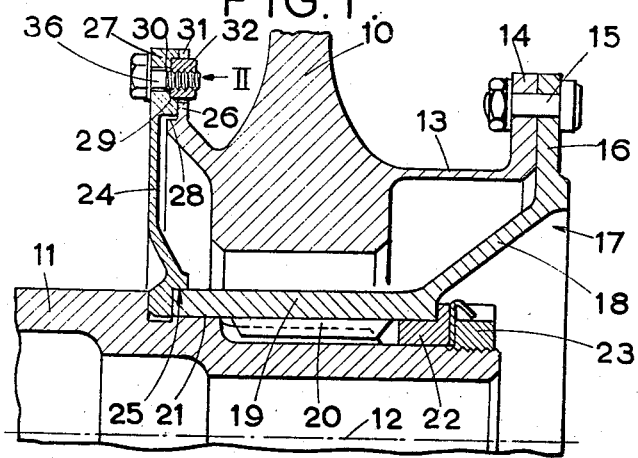
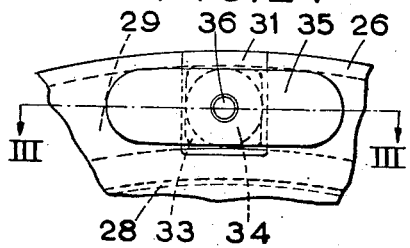
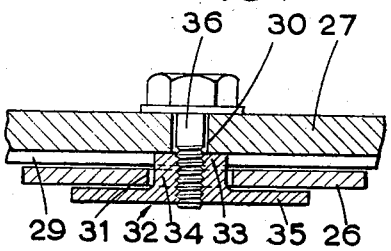
INVENTOR
Frederick William Walton Morley
BY
Leech and Radue
ATTORNEYS

United States Patent Office 2,804,323
Patented Aug. 27, 1957

2,804,323

AXIAL-FLOW COMPRESSORS AND TURBINES

Frederick William Walton Morley, Castle Donington, England, assignor to Rolls-Royce Limited, Derby, England, a British company Application July 22, 1955, Serial No. 523,899

Claims priority, application Great Britain August 19, 1954

6 Claims. (Cl. 287—53)

This invention relates to axial-flow compressors and turbines, and relates in particular to rotors of such machines which are subjected to heating in operation.

One object of the invention is to provide improved means for mounting the rotor of an axial-flow turbine or compressor on a shaft or the like in such a manner as to allow for relative thermal expansion therebetween.

According to this invention, means for mounting a rotor disc of an axial-flow turbine or compressor on a shaft comprises a rigid substantially frusto-conical flange extending from the shaft and having secured to its larger-diameter part a thin substantially cylindrical flange which extends from the turbine disc, the cylindrical flange being of such thickness as to permit expansion of the rotor disc with respect to the shaft while maintaining the parts substantially coaxial, and a radially-extending disc-like member having its inner periphery in contact with the shaft on the side of the rotor disc remote from the cylindrical flange and having on its outer periphery radial abutment means cooperating with radial abutment means on the turbine disc, thereby to resist deflection of the turbine disc from a plane at right angles to the turbine shaft by transmission of loads from the turbine disc radially inwards through the medium of said abutment means to said disc-like member and thence to the shaft.

Preferably the rotor disc and the disc-like member are in spigoted relation to one another, the arrangement being such that there is normally a small clearance between the spigoted parts which is taken up when the rotor disc tends to be deflected, by gyroscopic forces from the plane at right angles to the shaft axis.

Preferably also there is provided between the rotor disc and the disc-like member means preventing axial deflection of the one with respect to the other. The means may comprise a number of circumferentially-spaced T-shaped retainer members secured to one of the parts and defining spaces between the members and the part, the spaces being occupied by flange portions of the other part.

The substantially frusto-conical flange may be coaxially within the cylindrical flange, and thus increase in diameter away from the turbine disc, or the substantially frusto-conical flange may lie on the side of the cylindrical flange remote from the turbine disc and increase in diameter towards the turbine disc.

An embodiment of this invention will now be described by way of example, with reference to the accompanying drawings of which Figure 1 shows a first embodiment in axial section, Figure 2 shows a view, on an enlarged scale, on the arrow II of Figure 1, Figure 3 shows a section on the line III—III of Figure 2.

Referring now to Figure 1 which shows the preferred embodiment, there is shown the radially inner part of a rotor disc 10, in this case a turbine rotor disc and there is shown part of the shaft 11 on which the turbine rotor is mounted. The turbine is symmetrical about its rotational axis 12.

The turbine rotor disc 10 is mounted on the shaft 11 by means of a thin cylindrical flange 13 on the side of the disc nearer the end of the shaft; this flange 13 is formed at its end remote from the disc with a thicker radially-extending flange 14, and the latter is secured by bolts 15 to a similar flange 16 on a sleeve member 17. The sleeve member has a frusto-conical portion 18, the wider end of which joins the radially-extending flange 16 and the narrower end of which joins a cylindrical portion 19. The cylindrical portion 19 surrounds the shaft 11, and inter-engaging splines 20 are formed on the shaft and in the bore of portion 19; the cylindrical portion 19 is located concentrically with the shaft by having its bore in engagement with a land 21 on the shaft at one end of the splines, and by means of a bush 22 at the other end of the shaft. The sleeve member 17 is retained on the shaft 11 by means of a nut 23.

There is also provided an annular disc 24 which has its inner periphery trapped between an axial face on the shaft and the end of the cylindrical portion 19 of the sleeve member remote from the end of the shaft. The disc 24 lies in a radial plane on the side of the turbine disc 10 remote from flange 13, and has a bore 25 which engages the outer diameter of the cylindrical portion 19.

The outer periphery of the disc 24 engages with a flange 26 extending from the turbine disc 10, in the following manner; the disc 24 is formed with an outer peripheral portion 27 of enlarged thickness, and the flange 26 is recessed as shown at 28 to form a spigot within the portion 27; this spigot has a small clearance, however, during normal running. The axial face of the portion 27 is formed with a continuous circumferential groove 29 opening towards the flange 26; the groove 29 is of substantially rectangular section, and a number of drilled holes 30 in portion 27 open into the base of the groove 29 at spaced points around its circumference. The centre-lines of the holes 30 are at the same radius as the centre-line of groove 29. Around the periphery of flange 26, outside the spigot 28, there are formed a series of circumferentially-spaced slots 31, the spacing of the slots 31 being the same as the spacing of the holes 30 in portion 27. The depth of the slots 31 is such that their inner radius is somewhat less than the inner radius of groove 29. Co-operating with each of the slots 31 is a retainer member 32 which has a rectangular portion 33 which lies in the groove 29 and of which the width is slightly less than the width of the groove, an intermediate portion 34 of flattened circular section which passes through the slot 31, and a circumferentially-elongated end portion 35 which extends behind the flange 26 with a small clearance therefrom. The retainer members 32 are pulled up against the base of groove 29 by setscrews 36 which pass with a clearance through holes 30. It will be appreciated that rotation of the retainer members 32 relative to the setscrews 36 is prevented by the rectangular portions 33, and that the end portion 35 of each retainer member 32 prevents any substantial axial separation of flange 26 from the peripheral portion 27 of disc 24.

In operation of the turbine, the sleeve member 17 is rigid, and a drive is transmitted from the disc 10 through flange 13, bolts 15, frusto-conical portion 18, cylindrical portion 19 and splines 20 to the shaft 11. The flange 13 is flexible enough to allow expansion of the turbine disc 10 relative to the shaft 11, the disc tending to pivot about the junction of flange 13 and flange 14. It will be appreciated that the turbine disc 10 is subjected to appreciably more heating in operation than the shaft 11.

Under certain conditions of operation gyroscopic forces are encountered which tend to cause the turbine disc 10 to deflect from the plane at right angles to the shaft axis 12, and it has been found that owing to the flexibility of flange 13 this deflection may assume undesirable proportions and may result in the rotating disc 10 fouling the adjacent stationary structure.

However, the provision of the disc-like member 24 and its method of connection with the turbine disc 10 not only allows the turbine disc 10 to expand relative to the member 24, the flange 26 sliding radially with respect to the retainer member 32, but also resists the deflection of the turbine disc 10 from the plane normal to the turbine axis by the surface of flange 26 between slots 31 abutting the thickened portion 27 of the member 24 and the surface of flange 26 on the diametrically opposite side of the disc abutting the elongated portions 35 of the retainer members 32. Also in extreme cases the recessed portion 28 will come into contact with the thickened part 27 thus preventing further deflection of the turbine disc.

The way the apparatus operates is as follows:

When the turbine is heated to working temperature the disc 10 expands but remains substantially in the same plane at right angles to the axis of rotation. The flange 13 is flexible enough to allow this expansion to take place. At the working temperature there is still a radial clearance between the diameter shown at 28 on the flange 26 of the turbine disc and the co-operating diameter on the thickened portion 27 of the disc 24.

Under gyroscopic loads, due for example to too rapid turning of the aircraft in which the engine is mounted, the disc 10 tends to deflect from the plane at right angles to its axis of rotation. Seen in axial section as in Figure 1 it tends to lean over, and if the disc tends to lean so that its rim which is beyond the top of the drawing in Figure 1 moves to the right, the clearance of the spigot, that is to say the gap between the shoulder 28 and the inner perimeter of enlargement 27 is taken up and the deflection from its original plane is limited. Similarly if the disc tends to lean so that its upper rim shown in the drawing moves to the left the clearances which would be shown below the axis of rotation if the drawing extended so far tend to be taken up.

What I claim is:

1. Means for mounting a rotor disc of an axial flow turbine or compressor on a shaft which comprises a rigid substantially frusto-conical flange extending from the shaft, a substantially cylindrical flange extending from the rotor disc and being of such thickness as to permit radial expansion of the rotor disc with respect to the shaft while maintaining the parts substantially coaxial, means connecting said second flange to the first near the larger diameter thereof, a radially extending disc-like member having its inner periphery supported from the shaft on the side of the rotor disc remote from said cylindrical flange, and concentric spaced opposed annular abutment means on said disc-like member and rotor disc to resist deflection of the rotor disc from a plane at right angles to the shaft axis by transfer of load from the rotor disc radially inwardly to the shaft through the engagement of the said abutment means.

2. Means as claimed in claim 1 in which the rotor disc and the disc-like member are in spigoted relation to one another, the relative diameters of the facing abutment means being such as to provide expansion clearance which is taken up when deflecting gyroscopic forces acting on the rotor disc tend to deflect it from a plane at right angles to the shaft axis, whereby deflection is resisted by contact between said spigoted parts.

3. Means as claimed in claim 1 wherein there is provided means on one of said discs to engage the other to prevent axial deflection of the rotor disc with respect to the disc-like member.

4. Means as claimed in claim 3 wherein said engaging means includes a radial flange with parallel faces on one disc, spaced parallel faces on the other disc sandwiching the said radial flange faces, sandwiching engagement being such that the rotor disc may expand radially relative to the shaft and other disc but inhibiting relative axial movement of the discs in either direction.

5. Means as claimed in claim 3 wherein one of said spaced parallel faces comprises a number of circumferentially-spaced T-shaped retainer members secured to the other disc and defining spaces between them and the other parallel face receiving the radial flange loosely.

6. Means as claimed in claim 5 wherein the circumferentially-spaced T-shaped members are secured to the disc-like member and the rotor disc is provided with a flange which is on the side remote from the cylindrical flange and portions of which occupy the spaces.

References Cited in the file of this patent

UNITED STATES PATENTS

| | | |
|---|---|---|
| 2,672,279 | Willgoos | Mar. 16, 1954 |

FOREIGN PATENTS

| | | |
|---|---|---|
| 1,056,070 | France | Oct. 21, 1953 |
| 1,061,848 | France | Dec. 2, 1953 |